United States Patent [19]
Greider

[11] 3,952,370
[45] Apr. 27, 1976

[54] LOADING TUBE SLEEVE FOR USE WITH AN ENCASING MACHINE
[75] Inventor: Charles Austin Greider, Des Moines, Iowa
[73] Assignee: Townsend Engineering Company, Des Moines, Iowa
[22] Filed: Jan. 29, 1975
[21] Appl. No.: 544,889

Related U.S. Application Data
[63] Continuation of Ser. No. 307,057, Nov. 16, 1972, abandoned.

[52] U.S. Cl.......................................... 17/41; 17/42
[51] Int. Cl.².......................................... A22C 11/02
[58] Field of Search.................... 17/49, 1 F, 35, 41, 17/42; 138/118.1; 426/390, 465

[56] References Cited
UNITED STATES PATENTS
| 990,547 | 4/1911 | Gunuskey | 17/41 |
| 1,538,460 | 5/1925 | Brecht | 17/41 X |
| 2,325,446 | 7/1943 | Walter | 17/41 |
| 3,203,807 | 8/1965 | Sloan et al. | 17/41 X |

Primary Examiner—Louis G. Mancene
Assistant Examiner—J. N. Eskovitz
Attorney, Agent, or Firm—Zarley, McKee, Thomte, Voorhees & Sease

[57] ABSTRACT

A loading tube sleeve for use with an encasing machine having a stuffing tube is disclosed herein together with the method of preparing the natural casings so that they may be inserted into the machine. The sleeve comprises an elongated hollow member formed from expanded material. The folded casings are placed on the sleeve and are inserted into water until they are to be used. The sleeve is then slipped over the stuffing tube. The configuration of the sleeve is such that the casing will be easily and uniformly filled at the discharge end of the stuffing tube without damage to the casing.

2 Claims, 6 Drawing Figures

U.S. Patent   April 27, 1976   3,952,370
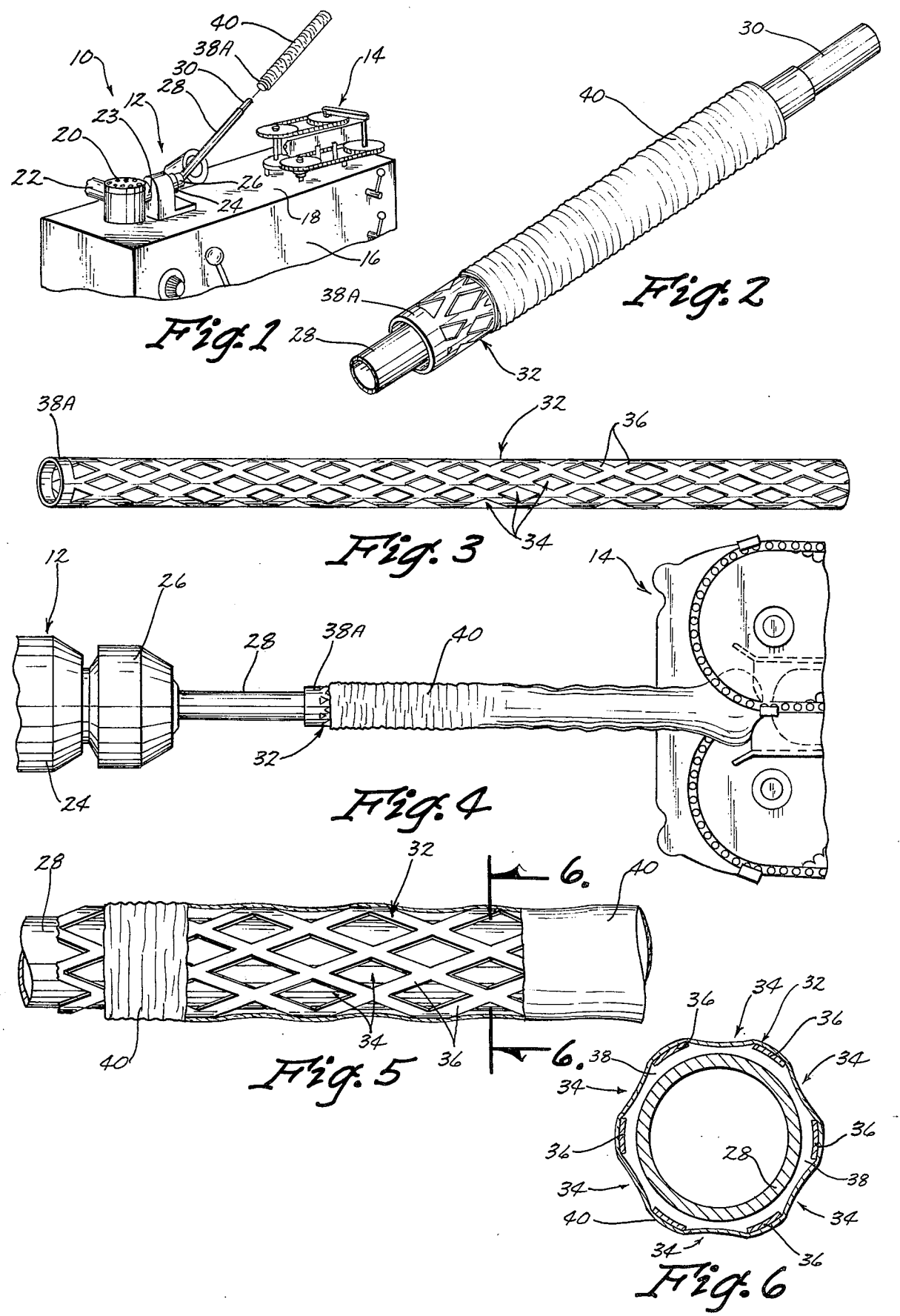

LOADING TUBE SLEEVE FOR USE WITH AN ENCASING MACHINE

This application is a continuation of application Ser. No. 307,057 filed Nov. 16, 1972, now abandoned.

BACKGROUND OF THE INVENTION

This invention relates to a loading tube sleeve for use with an encasing machine. Presently known product encasing devices include a stuffing tube, a pump for pumping plastic product through the stuffing tube, a rotary chuck in front of the discharge end of the stuffing tube, linking apparatus for linking the filled casing, and looping apparatus for arranging the links in loops. Prior to the encasing operation, a folded casing is mounted over the stuffing tube. The folded casing is compressed in an accordion-like fashion, and includes one unfolded end protruding beyond the discharge end of the stuffing tube. As the product issues from the discharge end of the stuffing tube, it fills the portion of the casing protruding therebeyond, thereby filling the casing and propelling it away from the discharge end so that additional portions of the casing will be unfolded and moved in front of the discharge end of the stuffing tube. Natural casings made of animal intestines or some artificial dissolvable or edible casings are ordinarily used on the encasing machine and are easily torn. Thus, it is necessary to support the casing in such a way that it can move easily on the stuffing tube and so that the casing can be easily and uniformly pulled off the end of the stuffing tube without damage to the casing. A conventional encasing machine requires considerable machine down time when the folded casings are inserted into the machine.

Therefore, it is a principle object of the invention to provide a means for inserting folded casings into an encasing machine which requires a minimum of machine down-time.

A further object of this invention is to provide a loading tube sleeve for use with an encasing machine.

A further object of the invention is to provide a means for supporting a folded casing on an encasing machine which insures that the casing can be easily and uniformly pulled off the end of the stuffing tube without damage to the casing.

A further object of the invention is to provide a loading tube sleeve for use with an encasing machine wherein atmospheric pressure is maintained within the casing prior to it being filled.

A further object of the invention is to provide a loading tube sleeve for use with an encasing machine which permits the casing or casings to be remotely "loaded".

A further object of the invention is to provide a loading tube sleeve for use with an encasing machine which possesses certain geometric characteristics so as to insure that the casing will be properly filled without damage thereto.

A further object of the invention is to provide a loading tube sleeve for use with an encasing machine which insures that the interior of the casing will be properly lubricated so as to prevent undesirable drag between the casing and the sleeve.

A further object of the invention is to provide a method of preparing the casings prior to their insertion into the encasing machine.

A still further object of the invention is to provide a loading tube sleeve which is economical in manufacture and durable in use.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a partial perspective view of a conventional encasing machine;

FIG. 2 is a perspective view of the loading tube sleeve of this invention mounted on a stuffing tube and having a casing mounted thereon;

FIG. 3 is a plan view of the loading tube sleeve;

FIG. 4 is a top view of the loading tube sleeve positioned on the stuffing tube;

FIG. 5 is a partial plan view of the loading tube sleeve mounted on the stuffing tube with portions of the casing cut away to more fully illustrate the invention; and FIG. 6 is an enlarged sectional view seen along lines 6—6 of FIG. 5.

DESCRIPTION OF THE PREFERRED EMBODIMENT

Referring to the drawings, the numeral 10 generally designates an apparatus for encasing a product so as to produce sausages, franks and the like. Apparatus 10 includes a casing filling machine 12, and a linking apparatus 14. The looping apparatus generally associated with apparatus 10 has not been shown for purposes of conciseness. The casing filling machine 12 and linking apparatus 14 are mounted on a support cabinet 16 having the conventional drive components therein.

Casing filling machine 12 is mounted on and supported by cabinet top 18 and includes a product pump 20 which is adapted to pump products of plastic consistency. Product pumps of this type are known in the art and therefore further description of pump 20 is unnecessary other than to state that it includes an inlet 22 adapted to be connected to a conduit leading from a supply of plastic products, and further includes an outlet conduit 23 which is adapted to receive the product being discharged from the pump 20.

Casing filling machine 12 also includes a spindle housing 24 having a conduit extending therethrough which is connected to the outlet conduit 23. A socket assembly 26 is secured to the spindle housing 24 and is rotated by conventional spindle components within the spindle housing 24. The socket assembly 26 has a stuffing tube 28 secured thereto and extending therefrom which may be moved from the operative position of FIG. 4 to the loading position illustrated in FIG. 1. Stuffing tube 28 is shown in the drawings to have a reduced diameter end portion 30 adapted to receive a fin head or the like thereon if desired.

The numeral 32 refers generally to the loading tube sleeve of this invention which is formed from an expanded metal material so as to provide diamond shaped openings 34 defined by webs 36. Loading tube sleeve 32 is provided with a collar 38a at one end thereof to facilitate the installation of the loading tube sleeve 32 on the stuffing tube 28. FIG. 6 illustrates the fact that the webs 36 and the openings 34 cooperate to provide an irregular diameter for the loading tube sleeve 32. FIG. 6 also illustrates the fact that the outside diameter of the stuffing tube 28 is less than the inside diameter of the sleeve 32 so as to provide an air space therebetween generally referred to by the reference numeral 38. The numeral 40 refers to a folded casing of natural material such as animal intestines, etc.

The sleeve 32 has a length sufficient so as to support at least one folded casing 40 thereon but it is advantageous to install as many casings 40 thereon as is possible to permit the machine to operate as long as possible without the insertion of additional casings. Assuming that the sleeve 32 has not yet been installed on the machine, the normal method of operation is as follows. The casing 40 is slipped over the sleeve 32 and the sleeve and the casing thereon are then placed in a suitable fluid such as water or the like until such time as the casing and sleeve are to be installed on the machine. When the encasing apparatus requires a casing 40, the stuffing tube 28 is pivoted upwardly to the position illustrated by FIG. 1 with the wet sleeve 32 and casing 40 then slipped onto the stuffing tube 28 as illustrated in the drawings. The stuffing tube 28 is then lowered to its operative position and the encasing operation is again resumed.

The wet sleeve 32 and the wet casing 40 cooperate to provide a small amount of lubrication therebetween so that the casing pulls from the end of the stuffing tube in a uniform manner. The irregular diameter of the sleeve 32 permits the casing 40 to slightly droop inwardly into the openings 34 as illustrated in FIG. 5 and in FIG. 6.

The fact that the loading tube sleeve 32 has a larger inside diameter than the outside diameter of the stuffing tube permits the sleeve 32 to be remotely "loaded" with a casing 40 or casings. When the sleeve 32 is placed over the stuffing tube 28 of the machine, it provides an air passageway or space 38 at the inside of the casing thereby maintaining atmospheric pressure inside the casing prior to the casing being filled. The reduced surface area of the sleeve 32 substantially reduces the surface over which atmospheric pressure could undesirably work.

The reduced surface area of the sleeve 32 also prevents any significant "dragging" action which is ordinarily experienced in product encasing operations. The shape of the openings 34 is also quite important in that there is a constantly changing geometry of a tight section of a casing as it moves longitudinally along the sleeve. There is no full circumference on the open sleeve 32 at any point along the sleeve, thus even if inadequate lubrication should occur completely around the casing, the added drag will not cause the casing to constrict enough to grab firmly on the sleeve. Lubrication is maintained at the closest point where any drag can occur such as where the casing drags on the web 36. If the sleeve 32 were of continuous construction without any openings formed therein, the capillarly action of the water would create an intimate contact between the casing and the sleeve thereby causing the casing to adhere to the sleeve and to increase objectionable frictional drag. The sleeve 32 of this invention limits such objectionable adherence or drag.

Thus it can be seen that a novel loading tube sleeve has been provided for an encasing machine which permits the casings to be prepared in advance for their use and which substantially reduces the amount of downtime ordinarily required for the replacement of casings therein. The sleeve 32 permits the casings 40 to be easily and quickly installed on the stuffing tube and permits the casings to be soaked in water prior to their usage. The configuration of the sleeve 32 is such that the casing is easily and uniformly filled at the discharge end of the stuffing tube without damage to the casing. Thus it can be seen that the invention accomplishes at least all of its stated objectives.

I claim:

1. In combination with an encasing machine having a stuffing tube means, comprising,
    an elongated loading tube sleeve embracing the stuffing tube means, said loading tube sleeve having a plurality of perforations formed therein,
    said loading tube sleeve having a length sufficient to support a folded casing thereon and having an irregular diameter to provide a constantly changing geometry for a tight section of casing as it moves longitudinally along the sleeve,
    said perforations being arranged on said loading tube sleeve so that said loading tube sleeve has less than a full circumference at any position along the substantial length thereof to reduce the drag imposed on the casing by said loading tube sleeve.

2. The apparatus of claim 1 wherein the outer surface of said loading tube sleeve is longitudinally sinusoidally contoured.

* * * * *